Patented Aug. 1, 1933

1,920,787

UNITED STATES PATENT OFFICE 1,920,787

PROCESS OF OBTAINING PURIFIED SULPHONIC ACIDS

Eduard Jozef Hammers and Egon Eichwald, Amsterdam, Netherlands, assignors, by mesne assignments, to The Flintkote Corporation, Boston, Mass., a Corporation of Massachusetts No Drawing. Application November 1, 1929, Serial No. 404,197, and in the Netherlands April 30, 1929

3 Claims. (Cl. 260—159)

In the manufacture of sulphonic acids by the action of sulphuric acid or oleum upon organic compounds, such as mineral oil bodies, the sulphonated products are more or less contaminated with sulphuric acid and sulphurous acid.

In other processes the reaction products obtained are contaminated with inorganic acids or salts.

In making extractions, with aqueous or alcoholic lye solutions, from mineral oil containing naphthenic acid and treated with sulphuric acid the naphthenic acids obtained are contaminated with alkaline sulphate and alkaline sulphite.

For various uses the presence of inorganic acids or salts in sulphonic acids, naphthenic acids and such like is an objection.

For instance when sulphonic acids are used as emulsifiers for so-called soluble oil the inorganic salts, such as sodium-sulphate, often crystallize after some length of time and are then apt to clog up pump lines, etc. Further it appears that when for instance naphthenic or sulphonic acids are used as emulsifiers for asphalt or similar bitumens, the salts contained therein tend to cause the emulsion to flocculate and thereby impair the usefulness of the emulsion.

Now according to this invention purified sulphonic acids, naphthenic acids and the like can be obtained in a simple manner. The invention consists in the contaminated substances being dissolved in water and treated with a certain quantity of tar oil or other oil which will dissolve the substances to be purified so as to cause the substances to be purified to separate out with the tar oil, while the objectionable inorganic acids or salts remain in the aqueous solution, after which the aqueous solution is removed by decantation, filtration or some similar manipulation and the tar oil subsequently distilled off from the purified substances.

Further it has been found that the separation of the substances to be purified, together with the tar oil, can be accelerated by previously adding to the tar oil a small quantity of an organic nitrogen base, such as aniline, pyridine and such like, or by adding these substances to the aqueous solution either together with or after the tar oil.

Example I 100 parts of acid tar, obtained by treating an Edeleanu raffinate from a spindle oil with 10% oleum ($SO_3$ content 20%), are diluted with 20 parts of water and then cooled down. The sulphonic acids precipitated, due to their insolubility in diluted sulphuric acid, are separated from the acid liquid and form the primary product to be purified. 100 kilos of this mass is dissolved hot in 200 kilos of water, after which 100 kilos of tar oil (boiling point 130–160° C.) is admixed while stirring. Two layers are then formed, and the aqueous bottom layer, which contains almost all the sulphuric acid, is drawn off. The upper layer which contains the sulphonic acids and the tar oil, is heated in vacuum to 110° C., when the tar oil is distilled off and the sulphonic acids are left in a practically pure state. The tar oil may be recovered in any convenient manner, for reuse.

Example II 100 kilos of the contaminated material from Example I is dissolved in 200 kilos of water as described above. The solution is treated with 100 kilos tar oil, to which 1 kilo pyridine is added. The rest of the process is as in Example I, the layers now separating much quicker, under the action of the pyridine.

Example III

The acid tar obtained by continuous acid treatment of an Edeleanu raffinate of a spindle oil which raffinate is previously treated with about 30% oleum, is mixed with about 20% water. 100 kilos of the sulphonic acid thereby precipitated and subsequently separated are dissolved in 400 litres of hot water, after which 25 kilos tar oil are added while stirring. The mass is then allowed to cool down, without any stirring. A solid cake then forms on the surface, composed of sulphonic acids and tar oil, which cake is easily separated from the aqueous layer underneath containing practically all the sulphuric acid. By distilling with steam the tar oil is separated and eventually recovered. Also in this example the action of the tar oil can be promoted by the addition of say 1% aniline.

The products obtained in this manner are eminently suitable as emulsifiers or stabilizers, according to their nature, in the manufacture of emulsions. They particularly lend themselves to the manufacture or stabilization of asphalt emulsions, and in certain instances also can be used for the manufacture of so-called soluble oil.

Further, the purified products are highly suitable for the demulsification of emulsions of an aqueous phase in a non-aqueous phase, such as petroleum emulsions and such like.

We claim as our invention:

1. The method of separating and purifying the organic acids present in acid sludge resulting from the treating of hydrocarbon oil with sulphuric acid, comprising treating the sludge with water to separate the bulk of the free sulphuric acid in a dilute condition, separating the dilute acid from the impure organic acids, adding water and tar oil together with a small quantity of organic nitrogen base to the separated impure acids to cause separation of an aqueous layer containing the impurities and an oily layer containing the purified organic acids, separating the layers and finally removing the oil from the purified acids.

2. The method of purifying sulphonic acids present in acid sludge resulting from sulphonation of hydrocarbon oil, which comprises diluting the acid sludge with water to precipitate the impure sulphonic acids, dissolving the precipitated, impure acids in water and mixing the same with an oil in which said sulphonic acids are soluble, separating the thus formed upper oily layer containing the purified acids from the lower aqueous layer containing the impurities, and distilling the oil from the separated oily layer to thereby obtain the purified sulphonic acids.

3. A method according to claim 2 wherein a small quantity of organic nitrogen base is added with the said oil.

EDUARD JOZEF HAMMERS.
EGON EICHWALD.